United States Patent [19]

Kozlowski et al.

[11] Patent Number: 4,692,199
[45] Date of Patent: Sep. 8, 1987

[54] METHOD AND APPARATUS FOR BONDING FABRIC TO A FOAM PAD

[75] Inventors: Eric F. Kozlowski; Edmund R. Kruger, both of Sterling Heights, Mich.

[73] Assignee: Lear Siegler, Inc., Santa Monica, Calif.

[21] Appl. No.: 808,841

[22] Filed: Dec. 13, 1985

[51] Int. Cl.⁴ .................................. B32B 31/06
[52] U.S. Cl. ........................... 156/245; 156/285; 264/257; 264/321; 264/324; 264/511; 264/546
[58] Field of Search ............... 156/245, 285; 264/45.1, 264/46.4, 46.8, 321, 324, 511, 546, 248, 257, 259, 263, 271.1, 553, DIG. 78; 428/304.4, 306.6, 308.4, 318.6

[56] References Cited

U.S. PATENT DOCUMENTS

| 3,320,108 | 5/1967 | Lande | 264/321 |
| 3,654,019 | 4/1972 | Cusick | 156/285 |
| 4,025,372 | 5/1977 | Fenton | 156/245 |
| 4,114,213 | 9/1978 | Beernaerts et al. | 264/46.8 |
| 4,264,386 | 4/1981 | Sears, Jr. et al. | 156/79 |
| 4,559,094 | 12/1985 | Hostetler et al. | 264/46.8 |

FOREIGN PATENT DOCUMENTS 0066978  6/1978  Japan ..................... 264/46.8
0140526 11/1980  Japan ..................... 264/46.8

Primary Examiner—Caleb Weston
Attorney, Agent, or Firm—Reising, Ethington, Barnard, Perry & Milton

[57] ABSTRACT

A vacuum (15) as applied to a porous contoured mold (18) for drawing an impervious adhesive film (16) against a cloth fabric layer (14) to conform the cloth fabric layer (14) to the contours of the mold surface. A matching cellular foam cushion pad (12) is placed in mating engagement with the adhesive film (16) as it is held to the contour of the mold surface by the vacuum. The foam pad (12) is compressed against the mold (18) by a perforated platen (36) and held in place as the vacuum is discontinued. Steam is then supplied through the porous mold (12) to heat and diffuse the adhesive film (16) into the adjacent fabric layer (14) and cellular foam pad (12) for adhesively securing the two together. A partial vacuum is then applied for removing moisture by drawing air through the perforations (44) of the platen (36), the foam pad (12), fabric layer (14) and porous mold (18). This ambient air also cools and cures the diffused adhesive between the fabric (14) and the foam (12).

18 Claims, 8 Drawing Figures

METHOD AND APPARATUS FOR BONDING FABRIC TO A FOAM PAD

TECHNICAL FIELD

The subject invention relates to the securing of a fabric or cloth to a cellular foam pad of the type utilized for seating and back cushions in automotive seats.

BACKGROUND ART

A great deal of development activity has been expended to eliminate the labor intensive cut and sew methods of wrapping cloth fabric about a cellular foam pad in automotive seat fabrications. One such development is disclosed in U.S. Pat. No. 4,264,386 to Sears et al wherein an impervious film is used in conjunction with a vacuum to draw fabric material into conformance with a contoured mold after which the foaming material is poured over the formed fabric. This patent teaches the use of liquid adhesives for bonding adjacent layers. A method for adhesively securing layers of fabric together is shown in U.S. Pat. No. 3,654,019 to Cusick. In accordance with the Cusick patent the layers of fabric are pressed together as a result of an impervious film disposed thereover drawn by a vacuum to compress the fabric layers in sandwiched relationship against the surface through which the vacuum is applied. The fabric layers are adhesively secured together by granules or small particles of adhesive which become molten when subjected to heat.

SUMMARY OF THE INVENTION AND ADVANTAGES

The subject invention provides a method and apparatus for fabricating a cushion assembly wherein a fabric layer is placed over a mold surface and thereafter an air impervious adhesive film is placed over the fabric layer. A vacuum is applied over the mold surface and through the fabric layer to draw the adhesive film down against the fabric layer to urge the fabric layer against the mold surfce. A cellular foam pad is placed in facing engagement with the adhesive film which is then heated and diffused into the foam pad and the fabric layer respectively. The difused adhesive layer is cured to secure the fabric layer to the foam pad.

The apparatus, besides including a mold presenting a mold surface having passages therein for establishing fluid communication with the mold surface and a vacuum means for suplying a vacuum over the mold surface and heating means for supplying heated fluid through the mold, also includes a platen means movable relative to the mold surface for compressing the mold pad against the mold surface with the fabric layer and adhesive film sandwiched therebetween.

The advantages of the subject invention include noncomplex individual steps of fabrication requiring minimal labor or manipulation and which steps accommodate high tolerances.

FIGURES IN THE DRAWINGS

An embodiment of a method and apparatus for bonding fabric to a foam pad constructed in accordance with the present invention will now be described by way of example only with reference to the accompanying drawings, in which.

Figure 7:
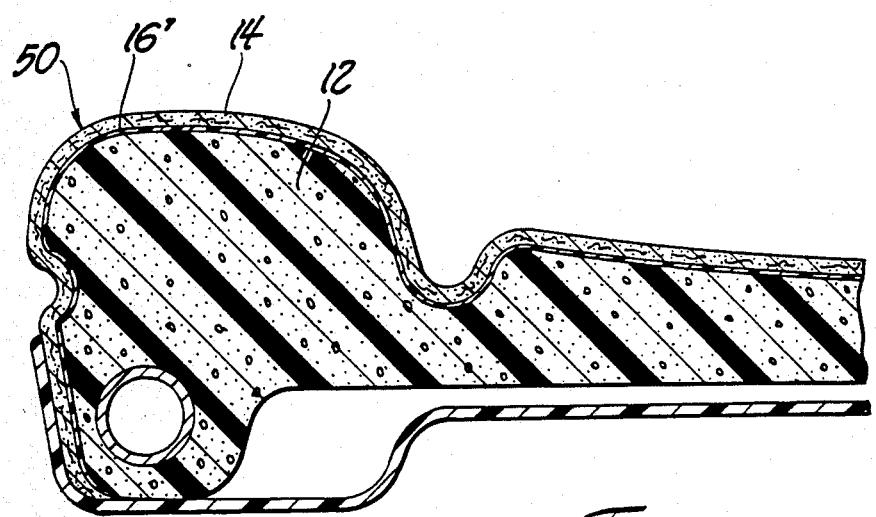
Figure 8:
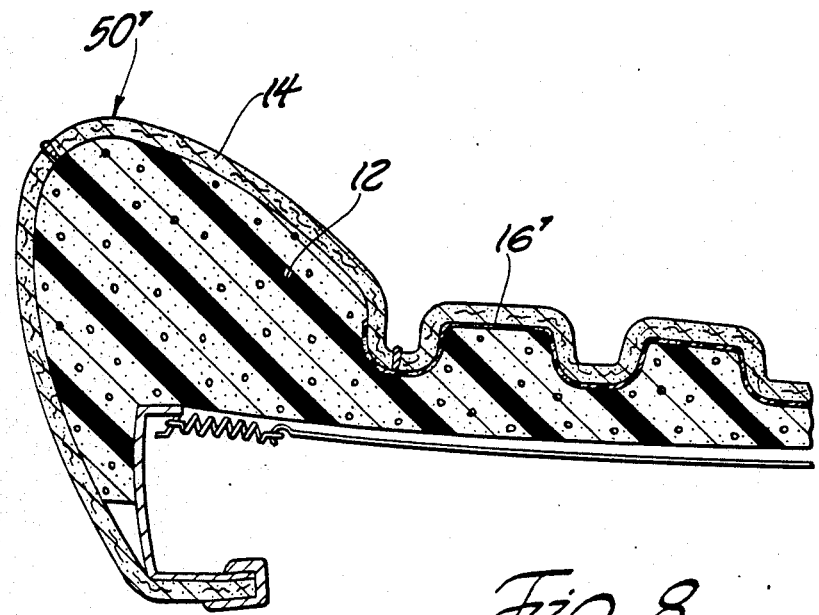

FIG. 7 is a fragmentary cross-sectional view of a cushion constructed in accordance with the subject invention where the entire foam pad is adhesively secured to the fabric cover; and FIG. 8 is a fragmentary cross-sectional view of a cushion constructed in accordance with the instant invention where only a portion of the mating surfaces of the fabric layer and foam pad are adhesively secured together.

DESCRIPTION OF THE PREFERRED EMBODIMENT

An apparatus constructed in accordance with the subject invention is generally shown at 10. The apparatus 10 is utilized for fabricating a cellular foam pad 12 to a porous fabric layer 14 with an impervious adhesive film 16.

Figure 1:
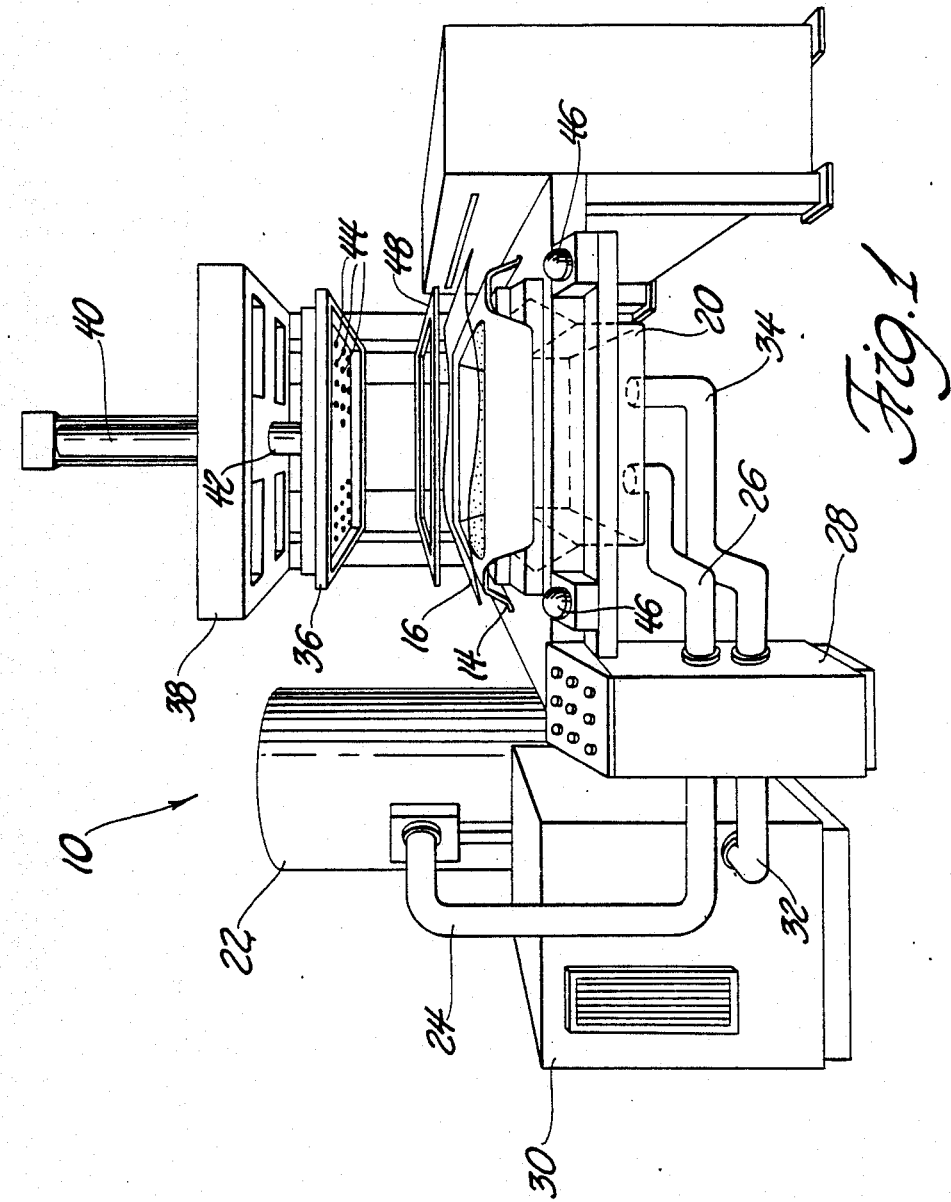
FIG. 1 is a perspective view of a preferred embodiment of an assembly constructed with accordance with the subject invention showing the adhesive film in exploded relationship to the fabric layer draped over the mold.
Figure 2:
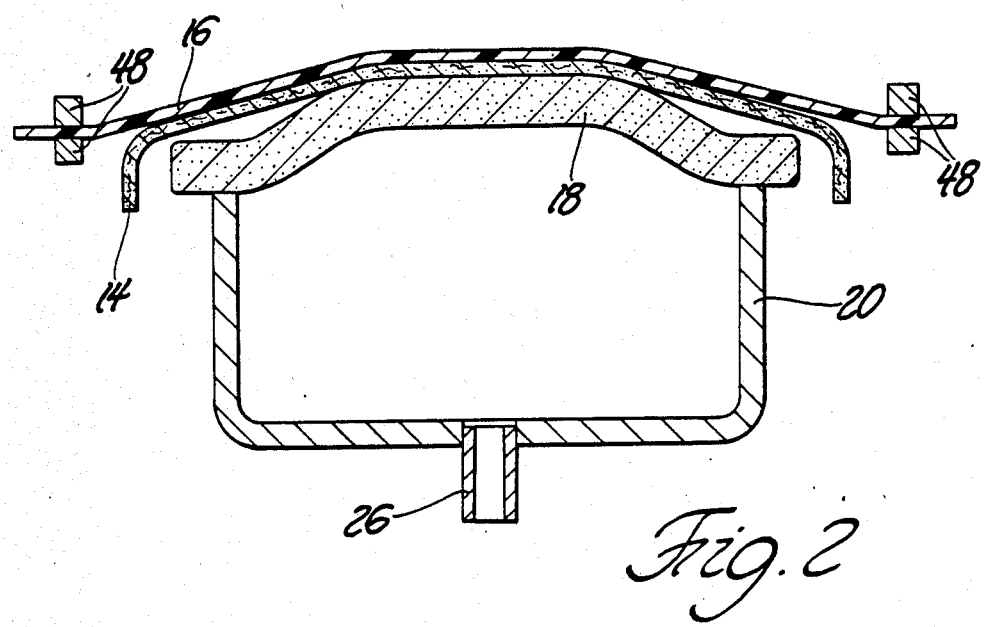
FIG. 2 is a schematic mold showing the fabric layer and adhesive film disposed over the mold as it would be in FIG. 1.
Figure 4:
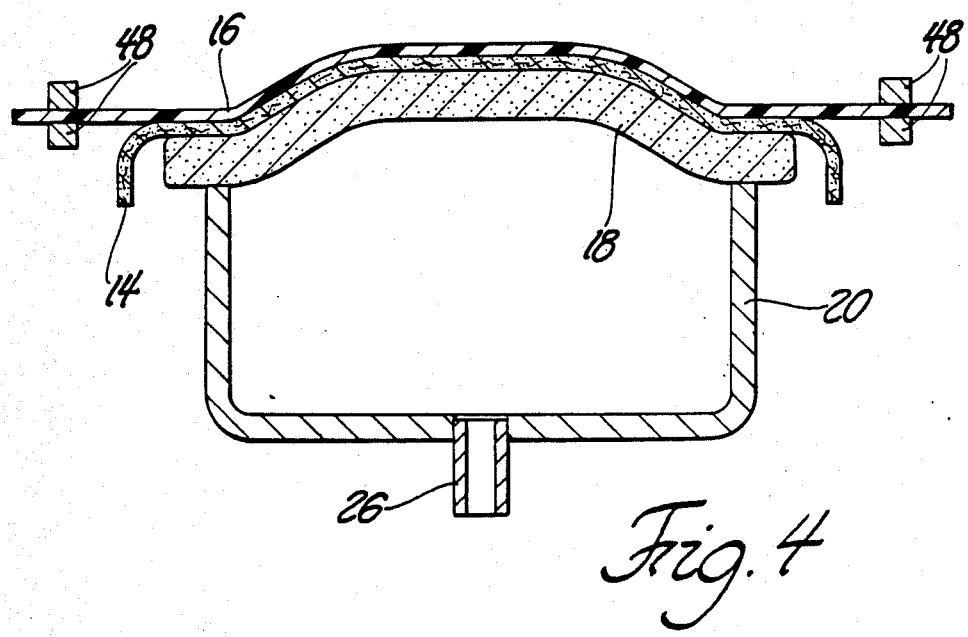
FIG. 4 is a schematic view showing the vacuum applied as it would be in FIG. 3.
Figure 3:
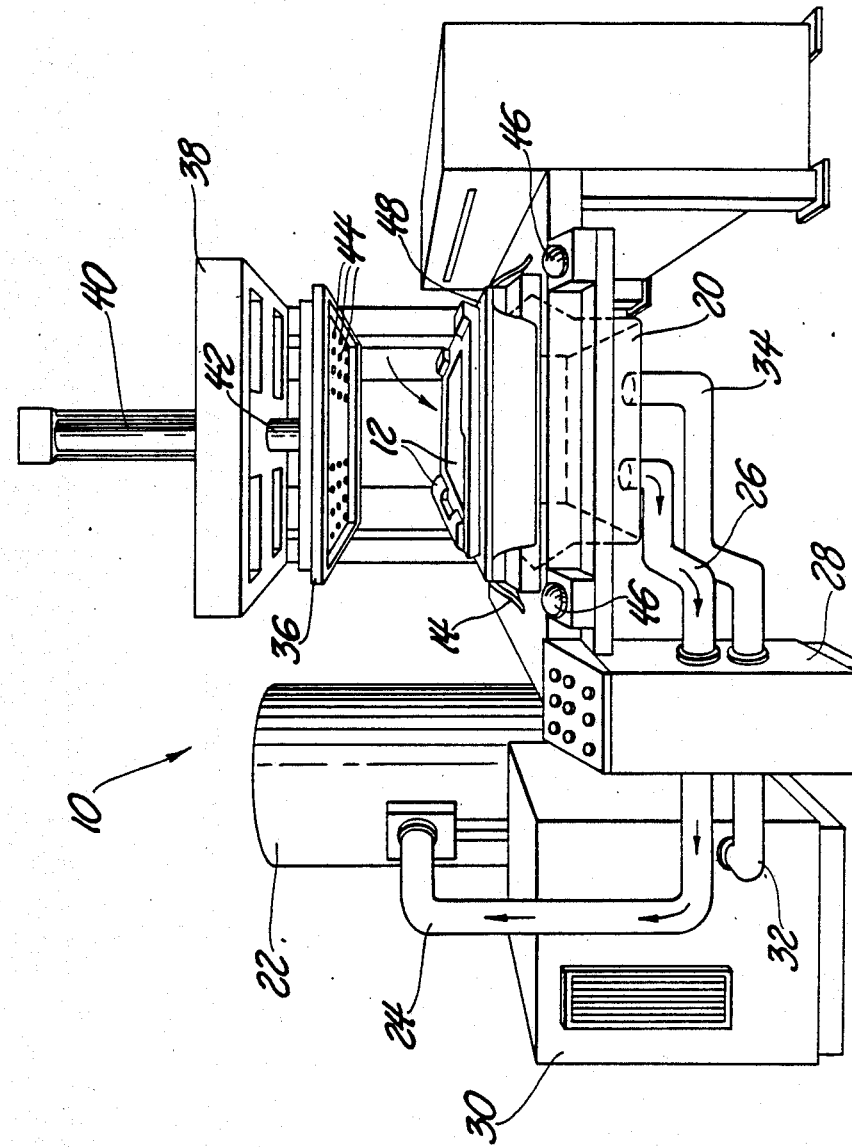
FIG. 3 is a view of the assembly shown in FIG. 1 with a vacuum applied to the mold surface.

The apparatus 10 includes a mold 18. The mold 18 presents an upper mold surface having passages therein for establishing fluid communication with the upper mold surface. As illustrated in FIG. 1 the mold 18 presents a female contoured mold surface whereas in the schematic illustrations of FIGS. 2, 4 and 6, the mold surface presents a male or upwardly projecting contoured surface. A housing 20 is disposed below the upper mold surface or member 18 for providing an air tight chamber in fluid communication with the passages in the mold 18. The mold 18 is preferably made of porous material such as compacted granular particles and fibers adhesively secured together but through which fluids in the form of either gases or liquids may freely flow. The mold is preferably made with metallic and carbide particles mixed with metallic needles and glass fibers in a binder, compacted and cured into a rigid porous structure having a relatively smooth surface.

A vacuum means 22 supplies a vacuum through the porous passages in the mold 18 to its upper surface. The vacuum means 22 includes a vacuum pump and tank connected by fluid lines 24, 26 and a control means 28 to the housing 20.

A heating means 30 supplies heated fluid through conduit 32, control means 28 and conduit 34 to the housing 20 and therefore through the porous passages in the mold 18. More specifically, the heating means 30 is a steam generator for supplying steam through the porous passages of the fibrous mold 18.

Also included is a platen means or pressing fixture 36 suspended from a support structure 38 for vertical movement relative to the mold 18 for compressing the foam pad 12 against the mold 18. A pneumatic cylinder 40 has a rod 42 for moving the platen 36 vertically in relation to the mold 18. The platen means 36 includes perforations or passages 44 extending therethrough for allowing the flow of air in response to a vacuum applied to the mold surface to draw air through the foam pad 12 and the platen means 36 when in the position shown in FIGS. 5 and 6.

The apparatus 10 includes a pair of manually actuated control buttons 46 upon which both hands of an operator must be placed for actuating the cylinder 40 to lower the platen 36 into compressing engagement with the foam pad 12.

The control means 28 includes valves between the conduits 24 and 26 as well as between the conduits 32 and 34. The control cabinet 28 has actuation buttons or control buttons on its upper surface for manual or automatic sequencing to sequentially actuate the vacuum means to draw the adhesive film 16 to the fabric layer 14 and against the mold surface of the mold 18. The control means also includes the actuation buttons 46 for moving the platen means 36 to compress the foam pad 12 into engagement with the adhesive film 16. Thereafter the control means 28 discontinues the vacuum through the conduit 26 and actuates the flow of steam from the heating means 30 to supply the heated steam to diffuse the adhesive film 16 respectively into the fabric layer 14 and the foam pad 12. The control means 28 also reactuates the vacuum means to draw air through the perforations 44 in the platen 36 and through the foam pad 12 and the fabric layer 14 to and through the porous mold 18.

The apparatus 10 also includes an appropriate clamping means 48 for clamping the periphery of the adhesive film 16 against the underlying fabric layer 14 and over the mold 18. As illustrated the clamping means 48 is a frame which extends in spaced relationship and about the periphery of the mold 18. Alternatively the clamping means may take the form of slip rings 48 schematically illustrated in FIGS. 2, 4 and 6. The clamping means may take the form of a plurality of clamps disposed in end to end relationship about the side wall periphery of the mold 18 for clamping the adhesive film 16 and the fabric layer 14 against the sides of the mold 18.

In accordance with the subject invention there is provided a method for fabricating a cushion assembly as generally indicated at 50 in FIG. 7 and 50' in FIG. 8. The cushion assemblies 50, 50' are typically utilized as seat and back supports in seat assemblies for automotive vehicles.

In accordance with the subject invention a cloth fabric layer 14 is placed over a mold surface of a mold 18. Thereafter an air impervious adhesive film or sheet 16 is placed over the fabric layer 14. The adhesive film 16 is thin and feels like a single layer of a trash bag. A preferred material which may be utilized as the adhesive film is clear so the operator can see the fabric layer to remove wrinkles by pulling out the periphery. The adhesive film may be a polyamide base film which is hydrophilic. It could also be a polyester used with hot air. A film sold under the trademark WW-22 from Westwood Products Inc. of 13570 Tonkian Road, Apple Valley, Calif., 92307 has proven satisfactory. The preferable film thickness is between one quarter to ten mils.

The periphery of the adhesive film is clamped by the clamping means 48 against the underlying fabric layer 14 and over the mold 18. Altenatively the film 16 may be draped over the fabric 14 and held in place in spaced relationship to the periphery of the mold as illustrated schematically in FIGS. 2 and 4. Although not shown the clamping means may move horizontally to clamp the film 16 against the fabric 14 and against the underlying side surfaces of the mold 18.

Thereafter vacuum pressure is applied from the vacuum chamber 22 through the conduit 24, control means 28, conduit 26, the housing 20 and through the porous mold 18 to the surface thereof and through the fabric layer 14 to act or react with the adhesive film 16 which is impervious to air to be drawn down against the fabric layer 14 to in turn urge the fabric layer against the mold 18. This is illustrated schematically in FIG. 4.

A cellular foam pad 12 is disposed in facing engagement with the adhesive film 16. In most instances the mold 18 will have a contoured mold surface with ribs or grooves therein whereby the preformed foam pad 12 will have the opposite contoured surface and may be moved or slid horizontally over the adhesive film 16 and into mating and non-slipping engagement with the contour presented by the mold 18. This is facilitated because the adhesive film 16 is not adhesive or tacky until it is heated; in fact the film 16 is slippery. The foam pad 12 may be manually and easily positioned on the mold 18 because no adhesive effects are obtained until the adhesive film 16 is heated to a predetermined fusing temperature.

Figure 5:
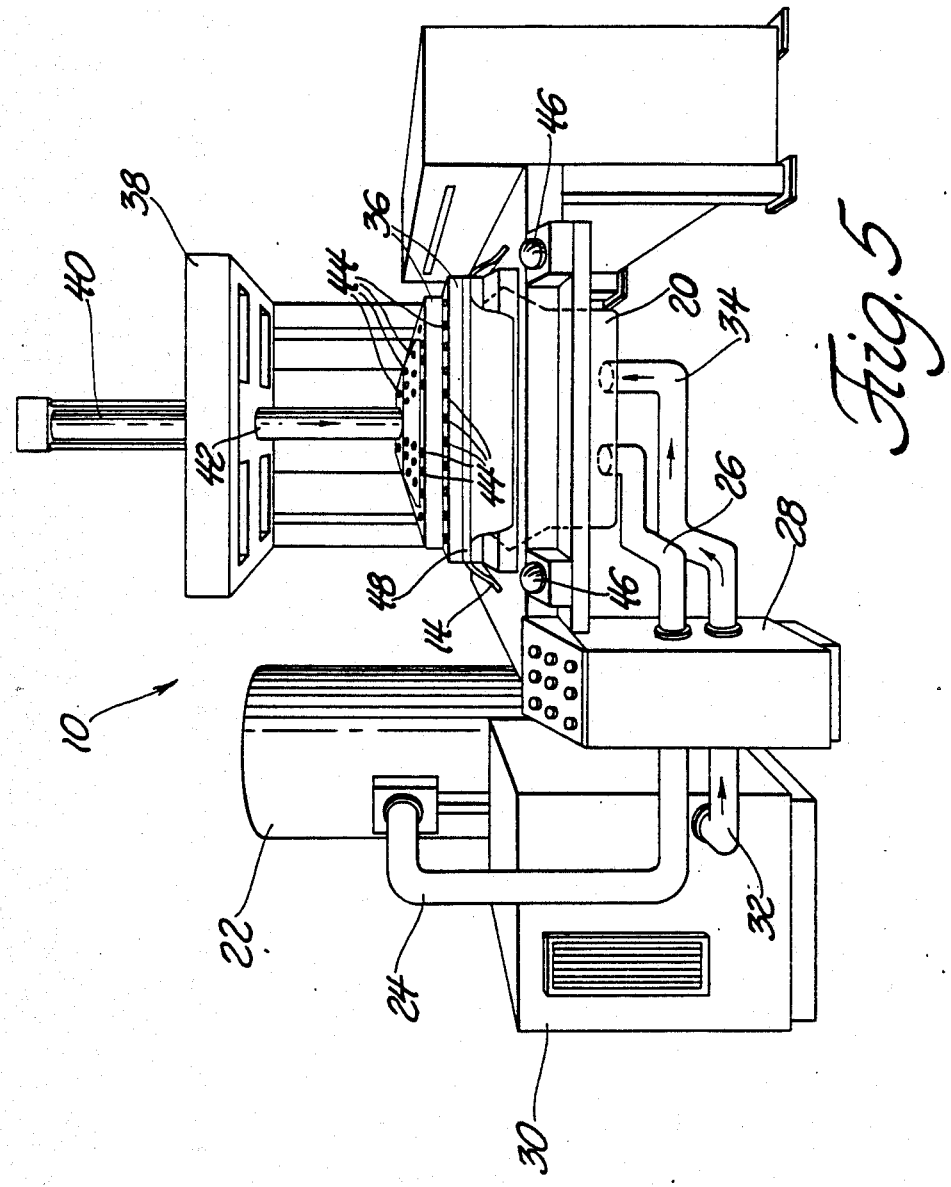
FIG. 5 is a view of the assembly shown in FIG. 1 with a foam pad compressed against the mold and heated fluid being supplied.
Figure 6:
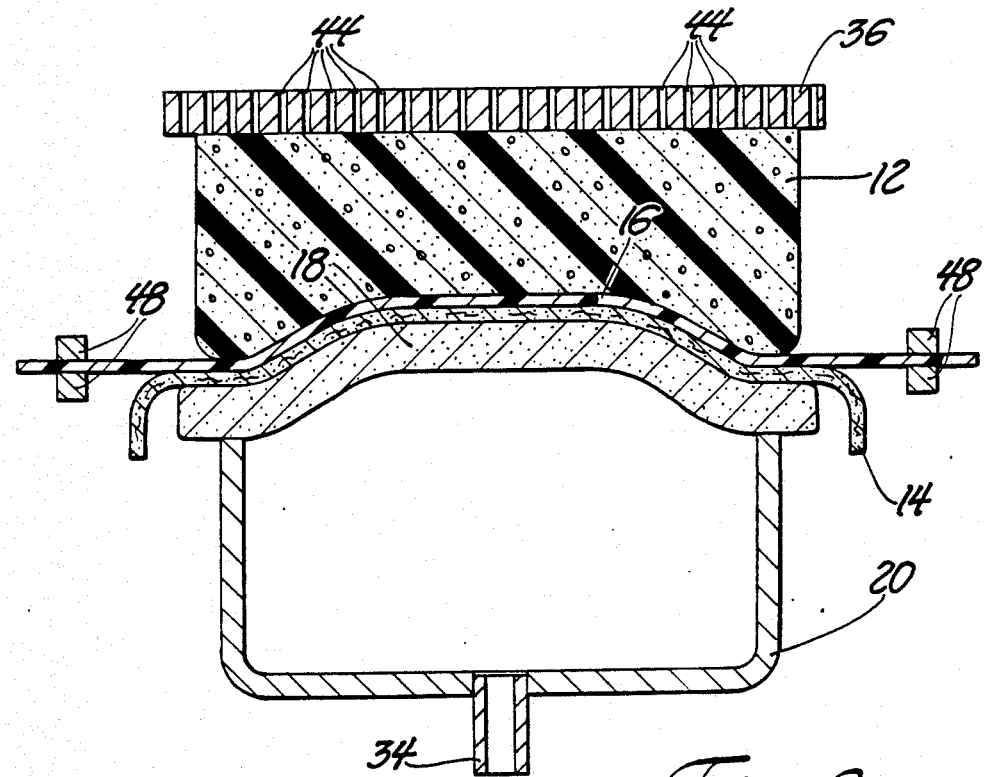
FIG. 6 is schematic view showing the steam being applied at it would be in the position shown in FIG. 5.

The platen means or plate 36 is moved downwardly by actuation of the pneumatic cylinder 40 to engage and compress the foam pad 12 against the adhesive film 16, the fabric layer 14 and ultimately the mold 18. This is best illustrated in FIGS. 5 and 6. Once the platen 36 has compressed the foam pad 12 to fix the pad 12 against horizontal measurement over the mold 18, the vacuum is discontinued. As the foam pad 12 is thus held in position, the adhesive film 16 is heated and diffused into the foam pad 12 and the fabric layer 14 respectively. The heating is accomplished by the heating means 30 which supplies steam through the conduit 30, the control means 28 and the conduit 34 to the housing 20 and thus through the porous mold 18 and the fabric layer 14 to the adhesive film 16. Once the adhesive is diffused it will allow the passage of air through the fabric layer and the porous pad 12 i.e., the adhesive becomes porous. Subsequently, the supply of steam is discontinued and a second vacuum from the vacuum chamber 22 is applied over the mold surface to extract or remove all moisture residue resulting from the steam. This second vacuum draws air through the perforations or passages 44 in the platen 36. The air drawn through the passages 44 passes through the cellular foam pad 12 and the fabric layer 14 and the porous mold 18 to cool and cure the adhesive before the platen 36 is removed to make sure that the fabric layer 14 is securely bonded to the pad 12. Thereafter the platen 36 is raised, the clamping means 48 removed and the cushion 50 manually removed.

FIG. 7 schematically illustrates an assembly wherein the adhesive bond is disposed over the entire surface of the pad 12 and mating surface of the fabric layer 14. However, in accordance with the subject invention the adhesive bond between the foam pad 21 and the fabric layer 14 may be only over a portion of the mating surfaces as illustrated in FIG. 8. Although the bonded adhesive is illustrated as a distinct layer in FIGS. 7 and 8, it is not in practice. Instead it is porous and random; it is in a matrix or webbing only shown schematically at 16' in FIGS. 7 and 8.

The foam pad 12 may be of various different known materials now utilized as cushion materials such as the polyester type or the polyurethane type. The fabric layer 14 may be any one of many fabrics currently utilized as decorative layers for a upholstered seats in automotive vehicles.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than is specifically described.

We claim:

1. A method of fabricating a cushion assembly (50, 50') comprising the steps of; placing a fabric layer (14) over a mold surface of a mold (18), placing an air impervious adhesive film (16) over the fabric layer (14), applying a vacuum pressure over the mold surface (18) and through the fabric layer (14) to draw the adhesive film (16) down against the fabric layer (14) and to urge the fabric layer (14) against the mold surface (18), characterized by placing a cellular foam pad (12) in facing engagement with the adhesive film (16), and heating and diffusing the adhesive layer (16) into the foam pad (12) and fabric layer (14) respectively, and curing the diffused adhesive to secure the fabric layer (14) to the foam pad (12).

2. A method as set forth in claim 1 further characterized by clamping the periphery of the adhesive film (16) against the underlying fabric layer (14) and over the mold (18).

3. A method as set forth in claim 1 further characterized by compressing the foam pad (12) against the adhesive film (16), fabric layer (14), and mold surface (18).

4. A method as set forth in claim 1 further characterized by placing the adhesive film over only a portion of the fabric layer to secure less than the entire fabric layer to less than the entire foam pad.

5. A method of fabricating a cushion assembly (50, 50') comprising the steps of; placing a fabric layer (14) over a mold surface of a mold (18), placing an air impervious adhesive film (16) over the fabric layer (14), applying a vacuum pressure over the mold surface (18) and through the fabric layer (14) to draw the adhesive film (16) down against the fabric layer (14) and to urge the fabric layer (14) against the mold surface (18), placing a cellular foam pad (12) in facing engagement with the adhesive film (16), compressing the foam pad (12) against the adhesive film (16) and fabric layer (14) and mold surface (18), and discontinuing the vacuum after the foam pad (12) is compressed against the mold surface (18), heating and diffusing the adhesive layer (16) into the foam pad (12) and fabric layer (14) respectively, and curing the diffused adhesive to secure the fabric layer (14) to the foam pad (12).

6. A method as set forth in claim 5 further characterized by supplying heated fluid over the mold surface (18) to melt and diffuse the adhesive film (16) into the foam pad (12) and fabric layer (14), respectively.

7. A method as set forth in claim 6 further characterized by applying a second vacuum over the mold surface after the adhesive film (16) has been heated.

8. A method as set forth in claim 7 further characterized by supplying steam as the heating fluid over the mold surface.

9. A method as set forth in claim 8 further characterized by applying the second vacuum to remove all moisture residue from the steam and for cooling to cure the adhesive.

10. A method as set forth in claim 9 further characterized as compressing the foam pad with a perforated platen movable relative to the mold surface.

11. A method as set forth in claim 10 further characterized by utilizing a porous mold and diffusing the vacuum and steam to the mold surface through the porous mold.

12. A method of fabricating an assembly (50, 50') comprising the steps of; placing a fabric layer (14) over a mold surface of a mold (18), placing an air impervious adhesive film (16) over the fabric layer (14), applying a vacuum pressure over the mold surface (18) and through the fabric layer (14) to draw the adhesive film (16) down against the fabric layer (14) and to urge the fabric layer (14) against the mold surface (18), placing a pad (12) in facing engagement with the adhesive film (16), compressing the pad (12) against the adhesive film (16) and fabric layer (14) and mold surface (18), and discontinuing the vacuum after the pad (12) is compressed against the mold surface (18), heating the adhesive film (16) to adhere the adhesive film (16) to the pad (12) and fabric layer (14), respectively, and curing the adhesive to secure the fabric layer (14) to the pad (12).

13. A method as set forth in claim 12 further characterized by supplying heat to the mold surface (18) to melt and diffuse the adhesive film (16) into the pad (12) and fabric layer (14), respectively.

14. A method as set forth in claim 13 further characterized by applying a second vacuum over the mold surface (18) after the adhesive film (16) has been heated.

15. A method of fabricating a cushion assembly (50, 50') comprising the steps of; placing a fabric layer (14) over a mold surface of a mold (18), placing an air impervious adhesive film (16) over the fabric layer (14), applying a vacuum pressure over the mold surface (18) and through the fabric layer (14) to draw the adhesive film (16) down against the fabric layer (14) and the urge the fabric layer (14) against the mold surface (18), utilizing a mold (18) having a contoured mold surface, and moving a preformed foam pad (12) having the opposite contoured surface over the adhesive film contoured to the mold surface and into mating and non-slipping engagement therewith, placing a cellular foam pad (12) in facing engagement with the adhesive film (16), heating and diffusing the adhesive layer (16) into the foam pad (12) and fabric layer (14) respectively, and curing the diffused adhesive to secure the fabric layer (14) to the foam pad (12).

16. A method of fabricating an assembly (50,50') comprising the steps of; placing a fabric layer (14) over a mold surface of a mold (18), placing an air impervious adhesive film (16) over the fabric layer (14), applying a vacuum pressure over the mold surface (18) and through the fabric layer (14) to draw the adhesive film (16) down against the fabric layer (14) and to urge the fabric layer (14) against the mold surface (18), characterized by placing a pad (12) in facing engagement with the adhesive film (16), and heating the adhesive film (16) to adhere the adhesive film (16) to the pad (12) and fabric layer (14), respectively, and curing the adhesive to secure the fabric layer (14) to the pad (12).

17. A method as set forth in claim 16 further characterized by clamping the periphery of the adhesive film (16) against the underlying fabric layer (14) and over the mold (18).

18. A method as set forth in claim 16 further characterized by compressing the pad (12) against the adhesive film (16), fabric layer (14), and mold surface (18).

* * * * *